United States Patent
Göttinger et al.

(10) Patent No.: US 9,364,997 B2
(45) Date of Patent: Jun. 14, 2016

(54) DEVICE AND METHOD FOR PRODUCING FIBER PREFORMS

(71) Applicant: Voith Patent GmbH, Heidenheim (DE)

(72) Inventors: Marco Göttinger, München (DE); Michael Kaiser, München (DE)

(73) Assignee: Voith Patent GmbH, Heidenheim (DE)

( * ) Notice: Subject to any disclaimer, the term of this patent is extended or adjusted under 35 U.S.C. 154(b) by 212 days.

(21) Appl. No.: 14/048,720

(22) Filed: Oct. 8, 2013

(65) Prior Publication Data
US 2014/0041795 A1    Feb. 13, 2014

Related U.S. Application Data

(63) Continuation of application No. PCT/EP2012/051309, filed on Jan. 27, 2012.

(30) Foreign Application Priority Data

Apr. 8, 2011  (DE) .......................... 10 2011 007 018

(51) Int. Cl.
*B29C 70/20*     (2006.01)
*B29C 70/38*     (2006.01)
(Continued)

(52) U.S. Cl.
CPC .................. *B29C 70/20* (2013.01); *B29B 11/16* (2013.01); *B29C 70/382* (2013.01); *B29C 70/541* (2013.01); *B29C 70/56* (2013.01); *B29C 70/207* (2013.01); *B29C 70/545* (2013.01); *Y10T 156/1028* (2015.01)

(58) Field of Classification Search
CPC .. B29C 70/207; B29C 70/382; B29C 70/541; B29C 70/545; B29C 70/56; B29C 70/20; B29B 11/16; Y10T 156/1028
USPC .......................... 156/212, 443, 122; 264/258
See application file for complete search history.

(56) References Cited

U.S. PATENT DOCUMENTS 4,790,898 A * 12/1988 Woods ........................ 156/166
4,999,150 A *  3/1991 Bevan ..................... B28B 23/00
                                                       264/108

(Continued)

FOREIGN PATENT DOCUMENTS

| DE | 10 2008 011 658 A1 | 9/2009 |
| DE | 10 2008 042 574 A1 | 4/2010 |
| DE | 10 2009 042 384 A1 | 4/2011 |

OTHER PUBLICATIONS

Machine translation of DE 10 2009 042 384 A1; Apr. 7, 2011.*
(Continued)

*Primary Examiner* — Jacob T Minskey
*Assistant Examiner* — Vishal I Patel
(74) *Attorney, Agent, or Firm* — Taylor IP, P.C.

(57) ABSTRACT

A method and a device for producing fiber preforms which are, for example, a precursor in the production of fiber reinforced plastic components, are disclosed. The method includes the steps of tensioning the threads or rovings, draping the threads or rovings over a molding tool and attaching the threads or rovings to a fiber preform. A plurality of separate grips grip individual or a plurality of threads or rovings at a plurality of thread transfer points allocated respectively to the individual grippers. The grippers are then moved in substantially parallel paths relative to each other and the threads or rovings are thereby tensioned side by side.

19 Claims, 9 Drawing Sheets

(51) Int. Cl.
*B29C 70/54* (2006.01)
*B29C 70/56* (2006.01)
*B29B 11/16* (2006.01)

(56) References Cited

U.S. PATENT DOCUMENTS 6,585,842 B1 * 7/2003 Bompard et al. ............. 156/166
2008/0202691 A1 8/2008 Hamlyn et al.
2010/0086727 A1 4/2010 Katayama et al.
2011/0000608 A1 * 1/2011 Bech ............................. 156/166

OTHER PUBLICATIONS

Notice of Transfer of International Research Report and the Written Notice Issued for International Searching Authority or Statement dated Apr. 25, 2012 for International Application No. PCT/EP2012/051309 (13 pages).

* cited by examiner

DEVICE AND METHOD FOR PRODUCING FIBER PREFORMS

CROSS REFERENCE TO RELATED APPLICATIONS

This is a continuation of PCT application No. PCT/EP2012/051309, entitled "DEVICE AND METHOD FOR PRODUCING FIBER PREFORMS, WHICH ARE A PRECURSOR IN THE PRODUCTION OF FIBER-REINFORCED PLASTIC COMPONENTS IN PARTICULAR", filed Jan. 27, 2012, which is incorporated herein by reference.

BACKGROUND OF THE INVENTION

1. Field of the Invention

The present invention relates to a device for producing fiber preforms, which in particular are a precursor in the production of fiber reinforced plastic components. The invention moreover relates to a method for using the device to produce fiber preforms.

2. Description of the Related Art

Fiber reinforced plastic consists of a matrix material which, among other factors, provides the stiffness, and of fibers which are embedded into the matrix material and which, among other factors provide the tensile strength. Fiber reinforced plastic is used in particular for highly stressed components which nevertheless need to be as light as possible. Since the fibers do not provide strength in a transverse direction, the fibers must be oriented such that their longitudinal direction conforms as closely as possible to the respective load direction. In order to achieve this, the fibers must often be laid in different directions. The better and more precisely the positioning of the fibers is adapted to the load, the better the component will be. There are numerous production methods for fiber reinforced plastic components. Methods which are particularly appropriate for the production of large quantities are however currently only available for rotationally symmetrical or plate-shaped or respectively line-shaped components through winding or plate-pressing or respectively extrusion.

In contrast, more complex high-grade structures can only be produced at high cost, since production of the required fiber preforms is difficult, slow and expensive. High grade structures are generally produced from continuous fibers. In many processes, fiber preforms, are initially produced according to the desired three-dimensional component shape—so-called preforms—which consist predominantly of fibers which are often arranged in several layers on top of one another to achieve the necessary fiber orientation. Afterwards, the fiber preforms are impregnated or coated with the matrix material, sometimes also pressed and finally cured. For the production of the fiber preforms, as well as for impregnation and/or curing of the components, molding tools according to the desired component shape can be used onto or into which the fiber preform or the component is placed and/or pressed.

So that the fiber preforms possess sufficient dimensional stability for further processing, they are provided with small amounts of adhesives or binding agents and, following the three-dimensional draping are fixed, for example by means of drying or heating and cooling.

The fiber preforms are usually created through placing on top of one another and fixing of prefabricated and pre-joined flat semi-finished product. Such semi-finished products are for example tapes or fabrics, laid thread structure or nonwovens, wherein a multitude of individual threads or rovings are already woven, sewn or agglutinated into a flat fabric. One refers to "thread" in the use of so-called continuous fibers, in other words if the fibers are unwound from a spool or from a ball of thread. Numerous threads which are unwound untwisted simultaneously from a spool or a ball of thread are referred to as thread bundle or roving. The rovings can hereby consist of several tens of thousands of individual threads which are also referred to as filaments.

The required individual parts are cut to size according to a type of pattern from a flat semi-finished product which is usually available in the form of a roll product, as is known from DE 10 2008 011 658 A1. Then they are placed over a molding tool and joined with each other or pressed together. One example for the production of such semi-finished products by means of agglutination or sewing is also given in DE 10 2008 011 658 A1. In spite of everything however, a large amount of manual actions are often necessary. A device for machine production of simple single-dimensional curved preforms with sections of semi-finished product which are pre-stored in a cartridge and are then deposited on a core, is known from DE 10 2008 042 574 A1. More complex forms cannot yet be produced by machine.

Another possibility for producing fiber preforms for more complex components is automated fiber placement. Here, narrow thread bundles or ribbons from thread bundles guided back and forth over the molding tool by a fiber placement head, and are thereby placed adjacent and on top of one another on the molding tool, pressed onto it and fixed. For more complex components, an expensive robotic control of the fiber placement head is necessary. Even when using two, three or even four parallel fiber placement heads the production speed is still relatively slow, since the heads often have to travel long distances and since they are working successively with narrow fiber bundles. Moreover, they have a very long and complicated thread-tracking from the creel to the multi-axial moving placement head. Such thread-tracking in flexible tubes with special guide blades to prevent turning of the rovings is shown, for example in U.S. 2008/0202691 A1.

What is needed in the art is a device and a method for production of fiber preforms, so that also more complex high grade structures can be more easily automated, and manufactured faster and cheaper, however remaining flexible in shape and thread orientation.

SUMMARY OF THE INVENTION

The present invention provides a device which generally includes a plurality of unwind stations for the provision of a plurality of threads or rovings and a plurality of grippers which can respectively grip individual or a plurality of threads or rovings at their origin. Each gripper is movable on a path between a maximum position and a pick-up position. The pick-up position is provided at a thread transfer point and is closer to the unwind station than the maximum position.

More specifically, the present invention provides a plurality of grippers, each gripper having its own maximum position and assigned to its own thread transfer point. Each gripper can be moved individually on substantially parallel paths and the device further includes at least one molding tool which can be brought between the thread transfer points and at least some of the grippers, for example in such a way that the threads or rovings are thereby draped over the molding tool. The inventive device including the grippers provides for simpler thread guidance and the grippers can operate simultaneously. Both lead to a significant increase in the placement rate. The device is configured such that it is capable of placing threads or roving material at rates of more than 2 kilograms per minute (kg/min) or even more than 3 kg/min. No complicated robotically controlled thread or roving tracking which would be rate limiting is necessary. In addition, this results in a greatly reduced friction in thread tracking. Ease of automation is provided and, because of the individual grippers, the device is flexible in producing various components and can be quickly reversed. Since the otherwise customary flat semi-finished products are being foregone and instead the fiber preform is draped and produced directly from threads or rovings, material costs compared to known methods are much lower. A short production time can nevertheless be achieved through parallelization. The flat semi-finished products are quite expensive because of prefabrication. With strongly three-dimensional components there is the additional risk of wrinkling when using large area semi-finished products. In small area components on the other hand, the expenditure for cutting and joining of the individual components increases.

The threads or rovings are stretched over the molding tool, thereby establishing its shape. An additional molding tool may, for example, be provided which is consistent with the first molding tool and which can be brought together with same so that the threads or rovings are formed even more precisely into the desired three-dimensional structure between the molding tools. The direction of movement of the molding tool or tools is, for example, substantially vertical to the path of the grippers. The molding tool or tools can be equipped with a press device and/or a heating device in order to activate the present binding material, so that the individual threads or rovings are bonded together to form the fiber preform Likewise, the molding tools can be attached to a mechanism as a replaceable or simply detachable part, for example on a lifting table or a lowering device. Obviously, multi-part molding tools may also be provided.

The plurality of unwind stations may, for example, be in the embodiment of so-called creels. The threads or rovings can hereby be drawn from the spools or balls of thread (bobbins). Each thread transfer point receives threads or rovings from one or more unwinding stations. On the spool or at the thread transfer point, or between them, a device for controlling or adjusting and/or a device for measuring the thread tension can be provided. At or before the thread transfer point a spreading device may be provided to prevent a convergence of the threads, and to provide flat coverage.

Moreover it is advantageous if the grippers can assume different individual intermediate positions on their path, and can retain the respective origins of the threads or rovings at these intermediate positions. Various shapes can thereby be reproduced. And, only the amount of thread is tensioned by each gripper which is required for the respective location of the shape.

The device may also be configured so that the grippers can be moved respectively on a substantially linear path from the pick-up position to the maximum position, thereby simplifying the implementation for the gripper movement even further.

It is advantageous when the individual grippers can be positioned on their path, following an outer contour of a molding tool. This means that the grippers hold on to the beginnings of the threads or rovings so that they are as close as possible to the point at which the fiber preform will have its edge at which the threads are separated after being formed on the molding tool. The grippers are therefore positioned where the respective threads or rovings leave the molding tool when it has been moved to the position for forming, or in the case of multi-part molding tools, when the molding tools have been moved together. This results in very little scrap of expensive fiber material, even with complex structures, which is especially important in batch production.

In order to enable a good reproduction of the desired component structure and for flexible adaption, the grippers may have a clamping width of for example in a range of between approximately 10-500 millimeters (mm) or in a range of between approximately 20-200 mm. The individual grippers may in particular also have a different width. Moreover, at least 5 grippers, for example at least 10 grippers, or at least 20 grippers can be provided. All grippers together can provide a total clamping width of at least 1 meter (m), for example at least 2 m, or at least 3 m. Therefore, larger fiber preforms can also be produced.

Moreover, at the thread transfer points the grippers may also grip binder material, for example, threads or fleece consisting at least partially of thermoplastic or adhesive, together with the threads or rovings. In this way also the binder material necessary for fixing is applied at the same time as the fiber material. The binder material may also be introduced by hybrid threads containing binder material in addition to fibrous material, or by coating or spraying of the threads or rovings. The binder material may also be applied after draping of the threads and rovings over a molding tool, for example by spraying.

A separating device may also be provided which can separate the threads or rovings between a molding tool and the grippers and/or a separating device which can separate the threads or rovings between a molding tool and the thread transfer points.

Furthermore, a fixing device may be provided which is suitable to connect the threads or roving s with each other in a molding tool or around a molding tool to a stable fiber preform, for example by applying pressure and/or increase in temperature. Existing binder material is activated by the fixing device and is fixed. The fixing device may be a heating device and/or a pressing device which are connected with one of the molding tools or are integrated in same. In addition a certain pre-activation may already occur near the thread transfer point during withdrawal of threads or rovings through heating.

A molding tool in the apparatus can also be rotated so that an additional layer of threads or rovings can be applied onto a first draped, for example fixed layer of threads or rovings, however with a different fiber orientation—such as rotated by approximately 30°, 45°, 60° or 90°. In this way several layers of fiber can be placed in the device, even with different orientation of the fibers, and can be joined together into a high-grade fiber preform, adapted to the subsequent loads.

For batch production a molding tool may also have a first draped, and for example also fixed, layer of threads or rovings which can be transferred to an additional inventive device in which a further layer of threads or rovings can be placed, however with a different fiber orientation—rotated, for example by approximately 30°, 45°, 60° or 90°. By arranging two or more rows of the devices according to the present invention in tandem, a production line for the placement of different fiber layers on one molding tool can be created. Therein the molding tool can be easily separated from the moving device in the respective apparatus. The transfer direction from one to the next device is, for example, approximately perpendicular to the paths of the grippers. The molding tool may be rotated in the releasing device or in the subsequent device, or in between, so that the desired fiber orientation for the additional layer is substantially consistent in the projection of the paths of the grippers of the subsequent device.

The present invention further provides a method for producing fiber preforms, the method including the following steps:

Tensioning of threads or rovings;
Draping of threads or roving s over a molding tool; and
Attaching of threads or rovings to a fiber preform.

More specifically, the present invention provides a method wherein a plurality of separate grippers grip individual or a plurality threads or rovings at a plurality of thread transfer points allocated respectively to individual grippers. The grippers are then moved in substantially parallel paths relative to each other and the threads or rovings are thereby tensioned side by side.

Several grippers can be moved simultaneously and independently of each other in one tensioning process. This allows the threads or rovings to be quickly tensioned parallel to each other and, in spite of this, each gripper can work independently.

At least one molding tool is positioned between the grippers and the thread transfer points, so that the threads or rovings are draped on a molding tool. The movement can occur through the molding tool or tools and/or creels and all utilized grippers are moved relative to a molding tool.

In order for the shape to be reproduced as well as possible and to create little scrap of expensive fiber material, the individual grippers may be positioned so that they hold on to the beginnings of the threads or roving s, following an outer contour of a molding tool.

In accordance with the method according to the present invention, all grippers when producing one layer are moved only once from the pickup position to the desired intermediate position where they remain until the layer is fixed and the threads or rovings have been severed. No expensive reciprocating movement is necessary.

The threads or rovings may be fixed as they are draped over a molding tool, for example, by an increased pressure or increased temperature. Existing binder material is then activated and joins the threads or rovings together so that the fiber preform obtains sufficient stability for further processing. Pre-activation of binder material, especially through heating may also occur already during unwinding of the threads or rovings at or near the thread transfer points.

With several molding tools which are formed according to the desired shape and which are moved together, a more precise shape can be achieved even in complex three-dimensional structures.

Especially with very strongly three-dimensionally configured components, it may be helpful to adjust or regulate the tension of threads or rovings during draping. Tearing of the threads can thereby be avoided.

After draping and after or during fixing, the threads or rovings are severed between molding tool and gripper and/or between molding tool and thread transfer point. Only very little scrap of fiber material remains on the grippers. The fiber material between the molding tool and thread transfer point can be rewound and used again.

In particular, for high-grade components, several layers of threads or rovings may be placed on a molding tool, wherein each layer in itself is first tensioned, then draped and fixed before the next layer is placed in a similar manner, for example in a different fiber orientation, for example rotated by approximately 30°, 45°, 60° or 90°.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 1a-7b illustrate a first embodiment of the inventive device in various process steps.

FIG. 1a is a side view of gripper capturing threads or rovings in accordance with a first embodiment of the inventive device;

FIG. 1b is a top view of gripper capturing threads or rovings in accordance with the device illustrated in FIG. 1a;

FIG. 2a is a side view after tensioning the threads or rovings in accordance with the device illustrated in FIG. 1a;

FIG. 2b is a top view after tensioning the threads or roving in accordance with the device illustrated in FIG. 1a;

FIG. 3a is a side view after a first draping step of first layer in accordance with the device illustrated in FIG. 1a;

FIG. 3b is a top view after a first draping step of first layer in accordance with the device illustrated in FIG. 1a;

FIG. 4a is a side view after a second draping step of first layer in accordance with the device illustrated in FIG. 1a;

FIG. 4b is a top view after a second draping step of first layer in accordance with the device illustrated in FIG. 1a;

FIG. 5a is a side view after severing of threads or rovings in accordance with the device illustrated in FIG. 1a;

FIG. 5b is a top view after severing of threads or rovings in accordance with the device illustrated in FIG. 1a;

FIG. 6a is a side view after rotating of molding tools, and gripper picking up threads or rovings for the second layer in accordance with the device illustrated in FIG. 1a;

FIG. 6b is a top view after rotating of molding tools and the gripper picking up threads or rovings for the second layer in accordance with the device illustrated in FIG. 1a;

FIG. 7a is a side view after a second draping step of second layer in accordance with the device illustrated in FIG. 1a;

FIG. 7b is a top view after a second draping step of second layer in accordance with the device illustrated in FIG. 1a;

FIG. 8a is a top view of a second embodiment of an inventive device after placement of first layer;

FIG. 8b is a top view of the inventive device of FIG. 8a after placement of an additional layer; and FIG. 8c is a top view of the inventive device of FIG. 8a after placement of yet another layer.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

In accordance with an embodiment of the present invention, the device is capable of carrying out the following process steps sequentially or partially parallel to one another:

provision of threads or rovings and possibly the binder material;
gripping the required threads or rovings and possibly the binder material;
tensioning of the required threads or rovings by positioning the grippers accordingly;
first draping over a first molding tool;
second draping with a second molding tool;
fixing the layer of threads or rovings;
severing of threads or rovings on both sides of the molding tools;

rewinding the released and unused threads or rovings;
opening the molding tooling tools; and
rotating and/or passing forward a molding tool with the applied layer.

Repeat the sequence for placement of additional layers in the same device, or in one or a plurality of additional inventive devices, to completion of the fiber preform.

Fibers, for example of carbon, glass, or aramid, or other fibers can be used as the fiber material for the threads or rovings. Thermoplastics or thermosetting plastics, epoxy resin, other plastics (polymers), or other resin may be considered as a matrix material for the fiber-reinforced plastic. The binder material can be thermoplastic or adhesive. It can either already be present as a hybrid thread or hybrid chloride roving, meaning that individual fibers or threads consist of binder material, or it can be tensioned together with the threads or rovings by the gripper, or it is applied or sprayed onto the draped threads or rovings.

Figure 1:
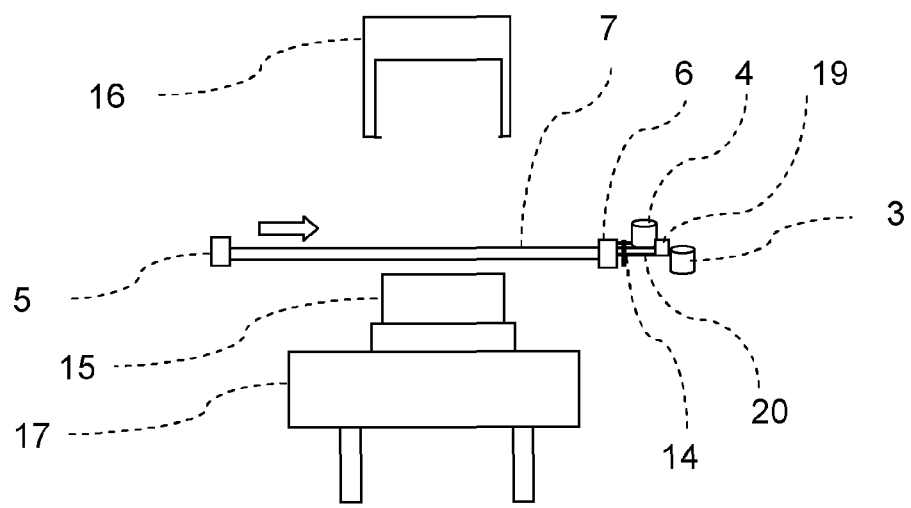
Figure 1:
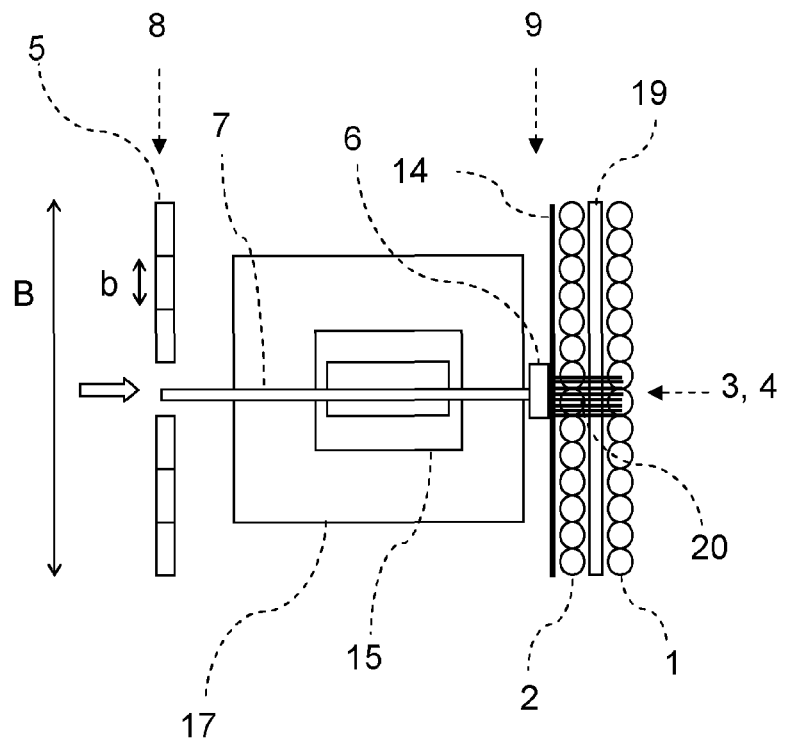

Referring now to the drawings, and more particularly to FIGS. 1a and 1b which show the basic structure of the inventive device. The provision of the threads or rovings occurs via a plurality of unwind stations in which the fiber material is provided in the form of spools or balls of thread (so-called bobbins), and which are arranged in several rows 1, 2 next to each other, behind one another or above one another. The spools can also form an upper and a lower row as shown in FIG. 1a. The origins of the threads or rovings 20 are shown schematically only in the respectively used region for the used unwind stations 3, 4. All other origins are also threaded to the corresponding thread transfer points 14 so that they can be captured by the associated grippers in pick-up positions 9. Collectively this is also referred to as creel.

On the other side grippers 5 are shown in their maximum positions 8, which in this case also correspond to the initial positions. The clamping width of a gripper is b, and the total clamping width of all grippers is B. Even if only grippers having equal widths are illustrated, grippers having different widths are of course possible. The grippers do not necessarily have to have their maximum and pick-up positions in one line. Moreover, first molding tool 15 is illustrated on lifting table 17, and second molding tool 16 which is formed as a hood is shown in starting position—in other words outside the paths of the grippers. The second molding tool is not shown in the top view. And a corresponding moving or lowering device for the second molding tool is also not specifically shown. Moreover a binder material supply 19 is provided which can be arranged for example, between the rows of unwind stations.

One gripper 6 is located in the pick-up position and fetches the threads or rovings corresponding to its position in the device by grasping their origins. The gripper is movable by guide device 7, for example a rod assembly or a piston. The grippers can move individually, however only linearly and on parallel paths adjacent to each other, between pick-up and maximum position. Thus a simple automation and a fast parallel movement is possible. As illustrated, several unwind stations can be combined into a group and be allocated to one gripper. One gripper can grasp multiple threads or rovings together. In any event, at least as many unwind stations as there are grippers should be provided.

Figure 2:
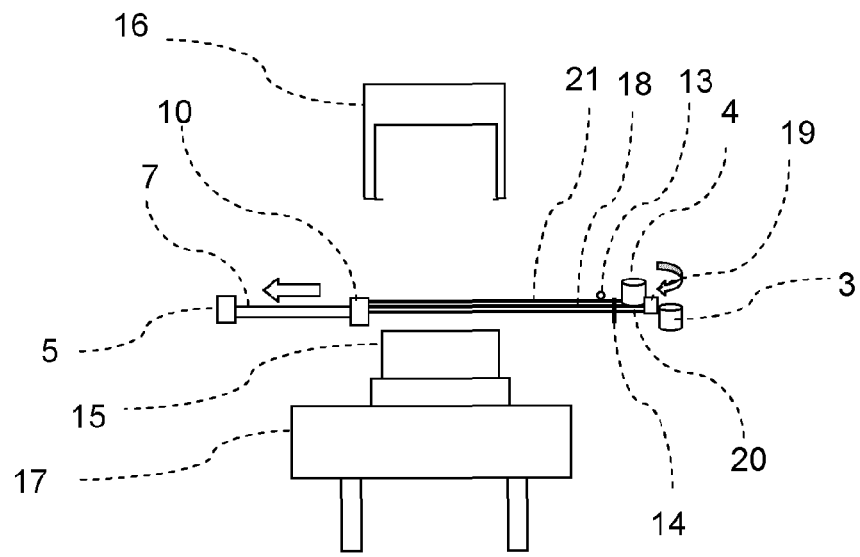
Figure 2:
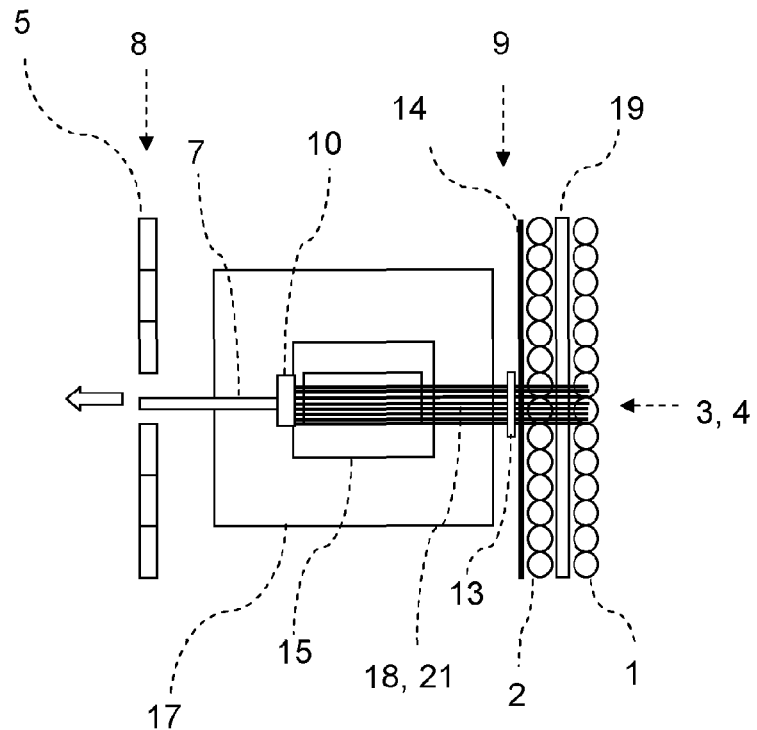

Referring now to FIGS. 2a and 2b, there is illustrated tensioned threads or rovings 21, which gripper 10 has withdrawn through its movement into the intermediate position. This can be assisted by actively driven unwinding. The intermediate position is located close to the outer contour of the molding tools or respectively near the subsequent position of the outer contour, when the molding tools are brought into their draping position. Binding material 18, for example in the form of binder threads or binder fleeces, can also be tensioned by the gripper together with the threads or rovings. As illustrated, the arrangement may include an upper and a lower row of unwind stations, so that the binder material is tensioned between the upper and the lower group of threads or rovings. During pulling out, the binder material can be pre-activated in the region of thread transfer points 14, for example by a heating device, so that the threads or rovings are already somewhat fixed to each other in the region of thread transfer points 14, immediately at the beginning of the draping process. Furthermore, a spreader device may be provided in the region of the thread transfer points which may be formed as a kind of comb having one or more rows of tines. This ensures that the threads or roving are positioned adjacent to each other and do not slip sideways even during subsequent draping. The spreader device may also be displaceable along the thread paths or along the gripper paths. Shown also is a possibility for a thread tensioning measuring device 13.

Draping is to be understood to be the reshaping or forming into shape the threads or rovings using a molding tooling tool. Draping may occur in one or more stages in that the molding tool or tools are moved simultaneously or consecutively in the layer of the tensioned threads or rovings. During the draping process it is feasible to regulate the thread tensions, for example to keep them constant. This means that the amount of threads or rovings is released as is necessary for draping at the respective position of the molding tool. To be able to achieve this, brake and clutch devices can be provided. For example, appropriate controls are assigned to each unwind station or each group of unwind stations. This prevents the threads or rovings from becoming overburdened or being laid too loosely. The thread tensions can also be measured by suitable measuring devices in the region of the thread transfer points and/or between the unwind stations and the thread transfer points. For example, the value of the thread tensions is between 1 and 50 Newtons per meter squared ($N/m^2$).

Figure 3:
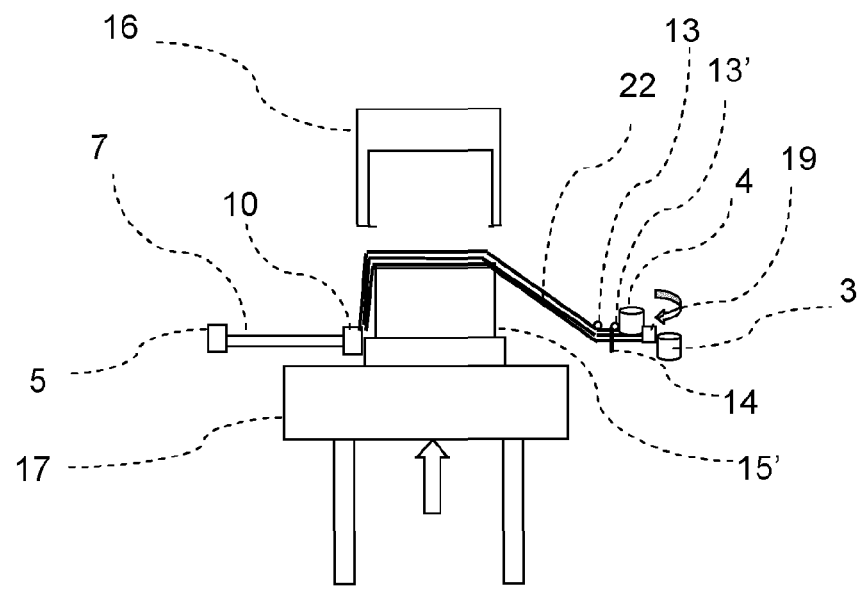
Figure 3:
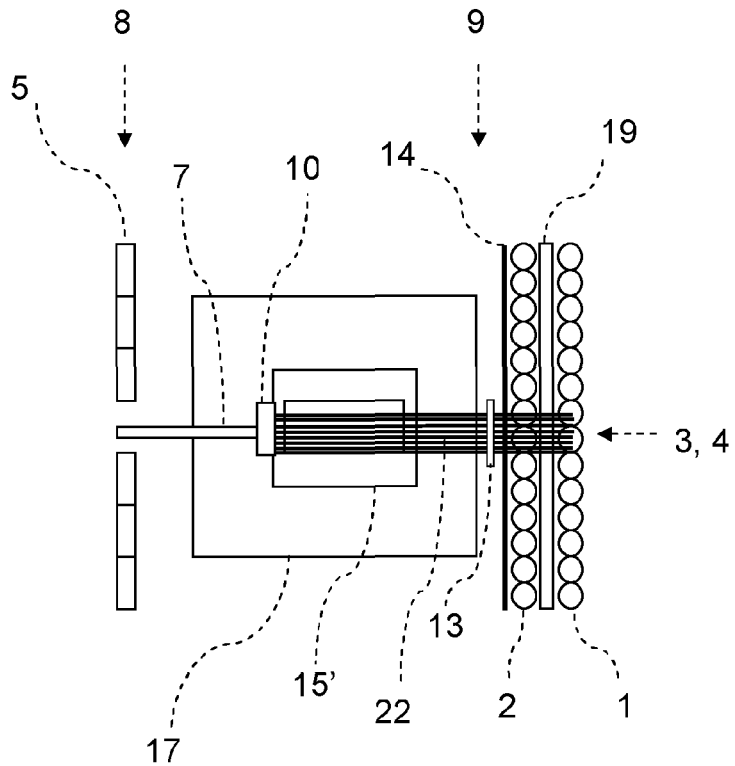

Referring now to FIGS. 3a and 3b, there is shown the condition after the first draping. Molding tool 15' is moved from lifting table 17 into the draping position. The threads or rovings 22 are thereby deflected and draped over molding tool 15'. Gripper 10 secures the beginning of the threads near the outer contour of molding tool 15'. After this step, binder material may be applied or sprayed on the threads or rovings, alternatively or additionally.

Figure 4:
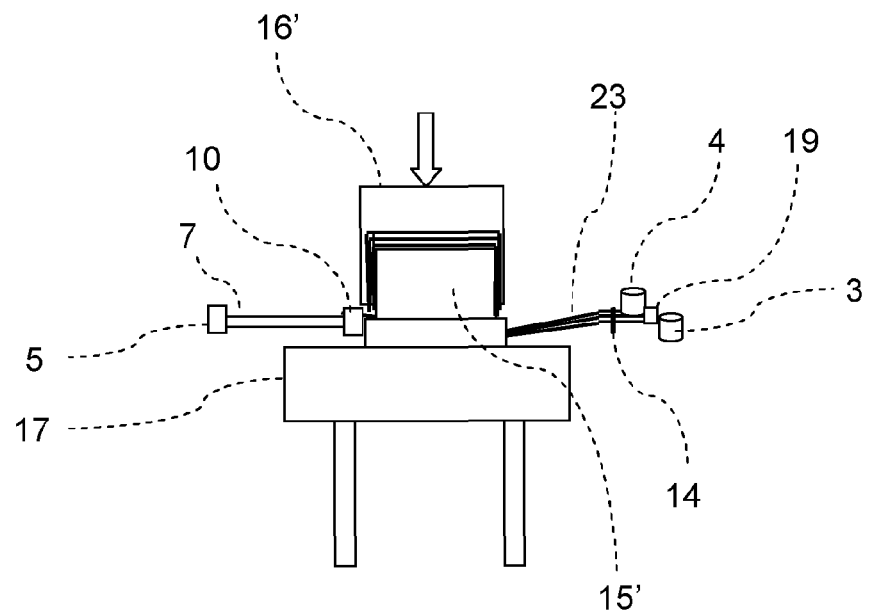
Figure 4:
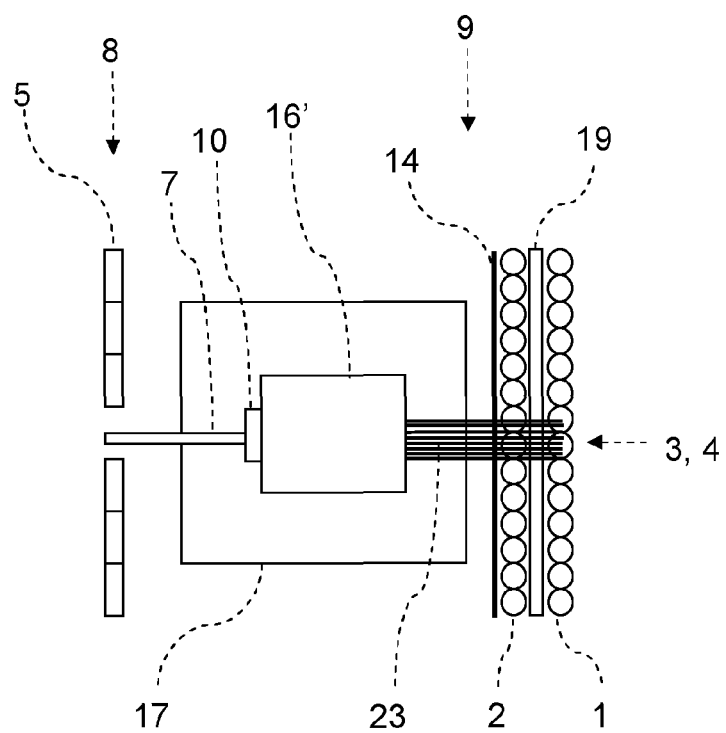

In the next step the threads or rovings are further draped or reshaped by second molding tool 16' which has been moved to its draping position. (FIGS. 4a and 4b). Through the interaction of the two molding tools, between which the layer of threads or rovings is located, accurate shaping is possible. The molding tools can also be pressed together, and one, for example the second, or both of the molding tools may be heated so that the binder material is activated and the threads or rovings are fixed to a dimensionally stable layer. Simultaneously with or after fixing, the threads or rovings are cut at both sides of the molding tools, in other words between gripper and molding tool and between thread transfer points and molding tool. In one embodiment the separating device may be connected with the first or second molding tool. The separation may occur at least on the side of the thread transfer positions close to the molding tool. This creates only a small amount of scrap of expensive fiber material and less reworking of the fiber preform is necessary.

The severed threads or rovings 23 may be retracted and rewound or stored temporarily by a suitable thread guide. Rewinding occurs in such a way that the beginnings of the threads or rovings in the thread transfer points 14 are again positioned so that they can be picked up by the grippers without too much scrap material being created. To detect the beginnings, sensors can be used.

Figure 5:
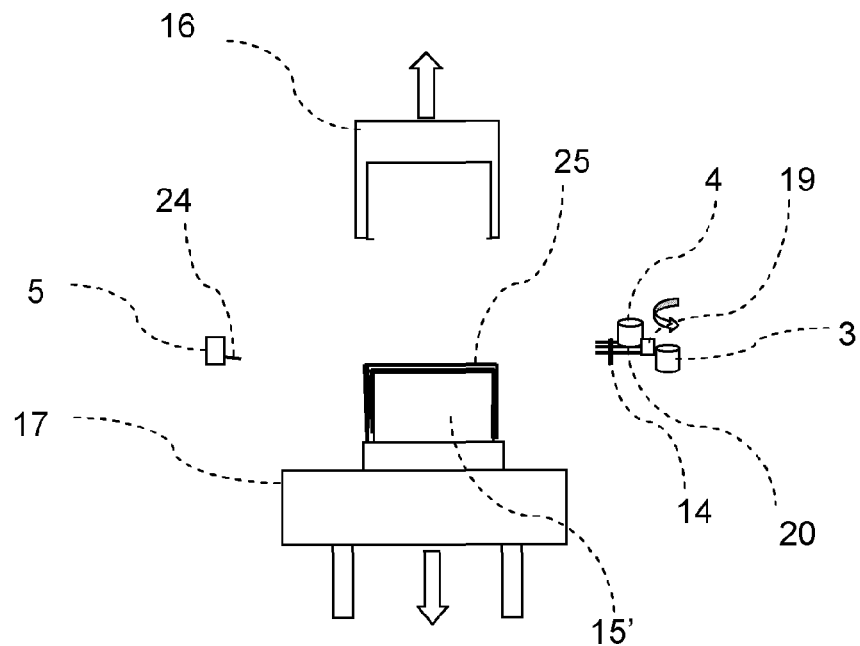
Figure 5:
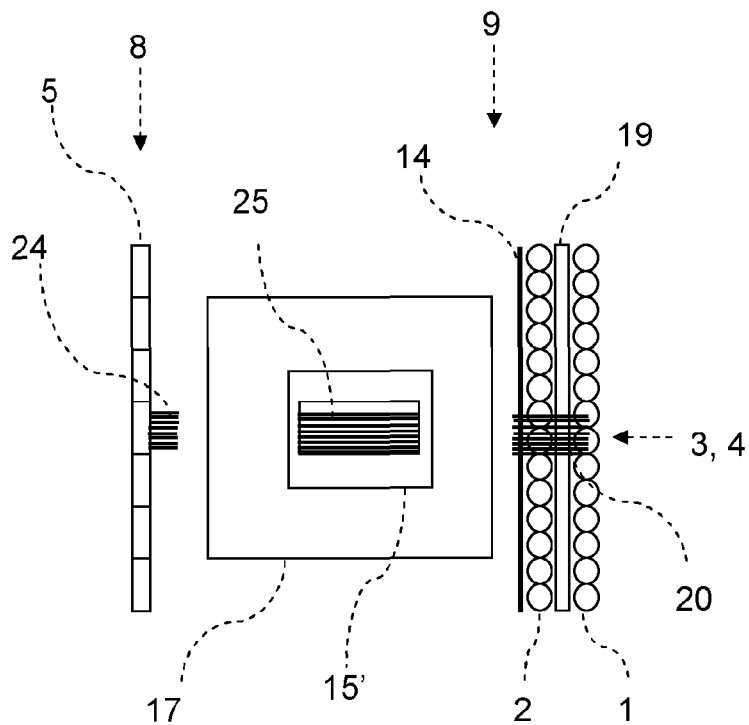

Referring now to FIGS. 5a and 5b, it is shown that the threads or rovings are already rewound or cut off at the thread transfer point, so that beginnings are located again at the thread transfer points. Only a small amount of scrap 24 fiber material is generated at the grippers, as they were positioned respectively closely to and along the outer contour of the molding tooling tools and tensioned only as much thread as was needed. Molding tools 15, 16 are returned to their starting position. The first formed layer 25 remains on the first molding tool.

Figure 6:
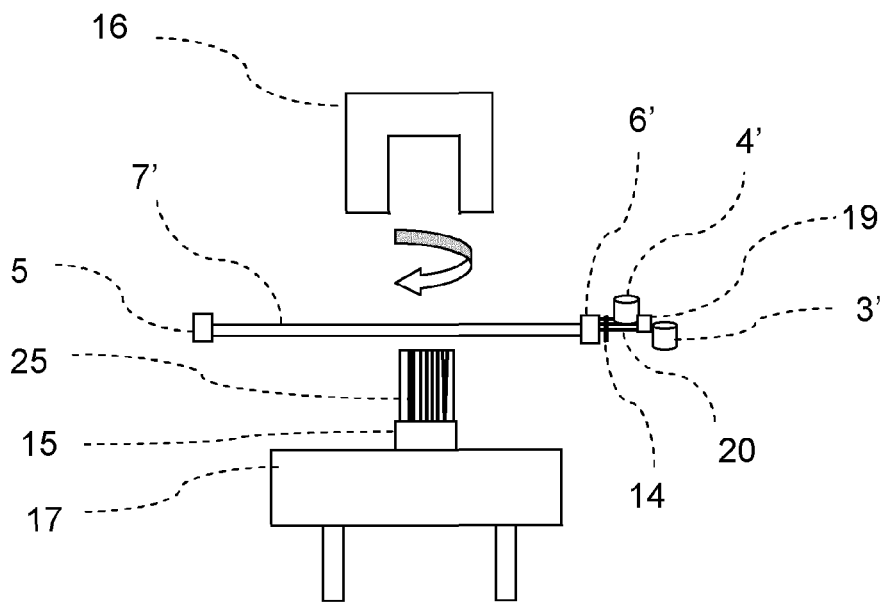
Figure 6:
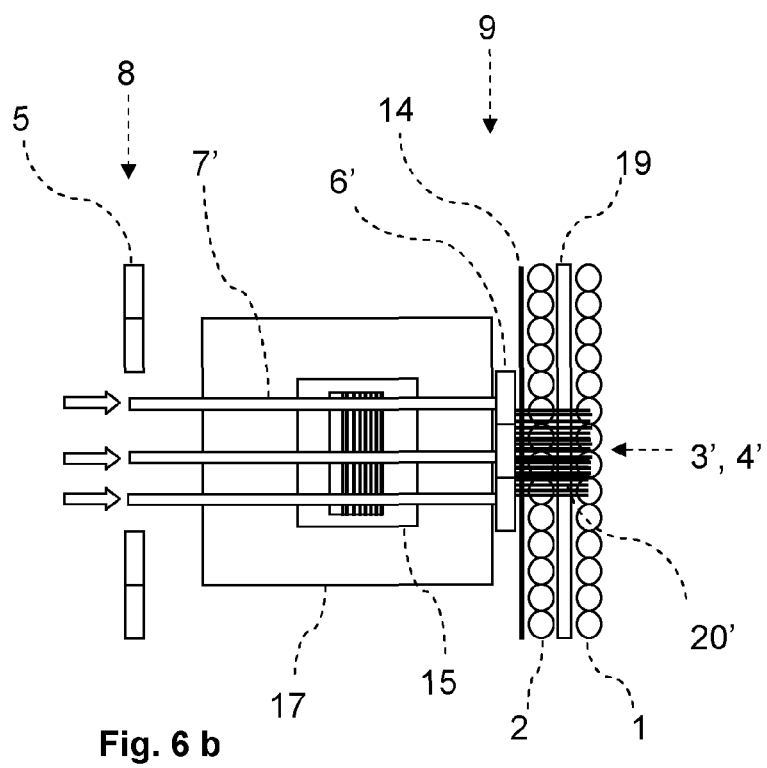

Referring now to FIGS. 6a and 6b, there is shown first and second molding tools 15, 16 in a rotated position. Here they were rotated by 90°. However, a different angle of rotation of approximately 30°, 45°, 60°, or tilting is also possible. An exemplary range of angle of rotation for the present invention is between 10 and 170°. This depends on how and with what fiber orientation the additional layer of threads or rovings is to be placed. Required grippers 6' are in the pick-up position in order to grip beginnings 20 of the used threads or rovings.

Then, the threads or rovings of the additional layer are tensioned to an intermediate position of the grippers, and draped in that the first and the second molding tools 15', 16' are moved into the draping position.

Figure 7:
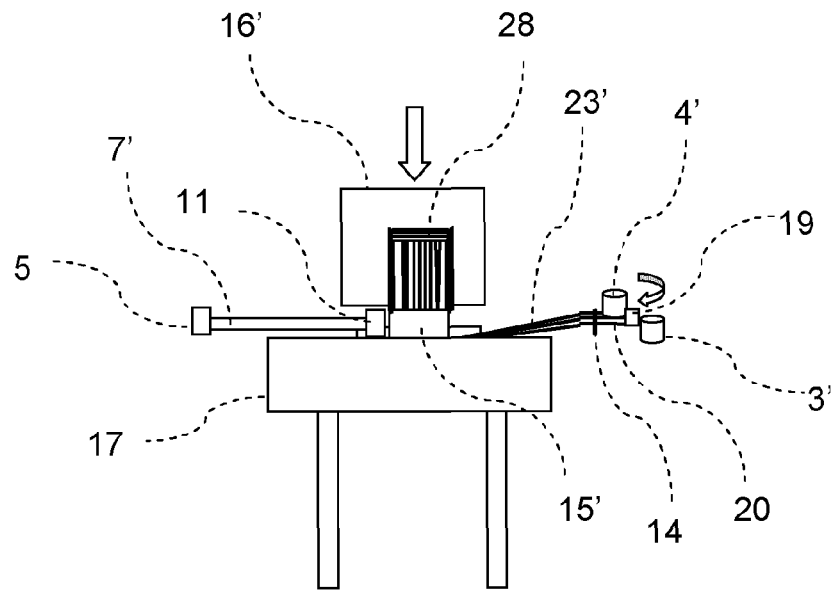
Figure 7:
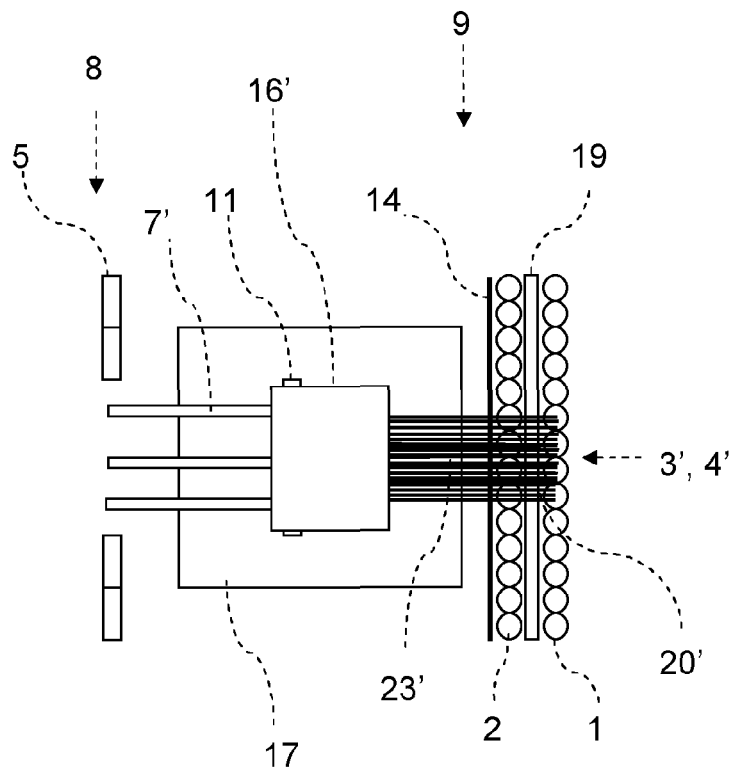

Referring now to FIGS. 7a and 7b the inventive device after the threads or rovings were severed. Used grippers 11 are in an intermediate position. In the case of non-rectangular molding tools or other angles of rotation, grippers 11 may also be in different intermediate positions. The additional layer of threads or roving, and possibly of binder material may also be fixed dimensionally stable in its shape and joined with the first layer by heating and/or pressing. Together they form fiber preform 28.

Figure 8:
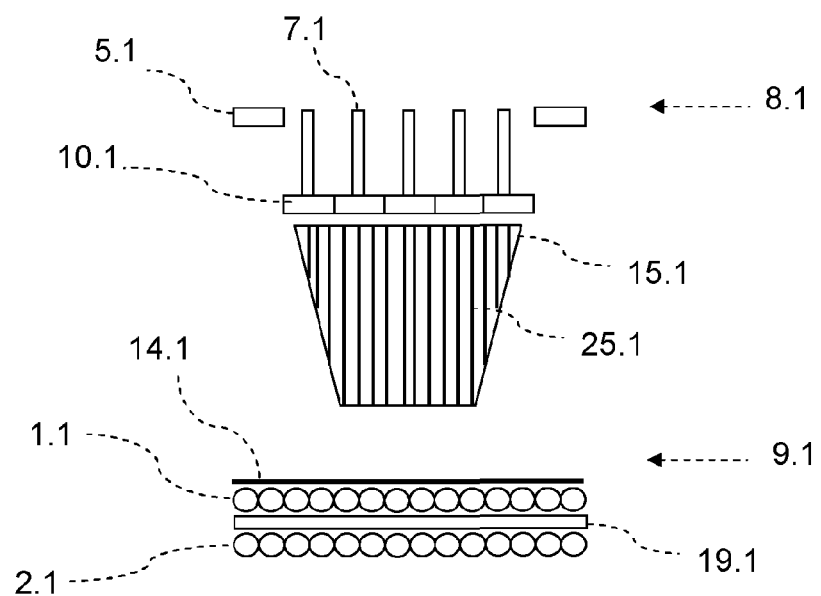
FIGS. 8a-8c illustrate a second embodiment of the inventive device, showing different process steps.
Figure 8:
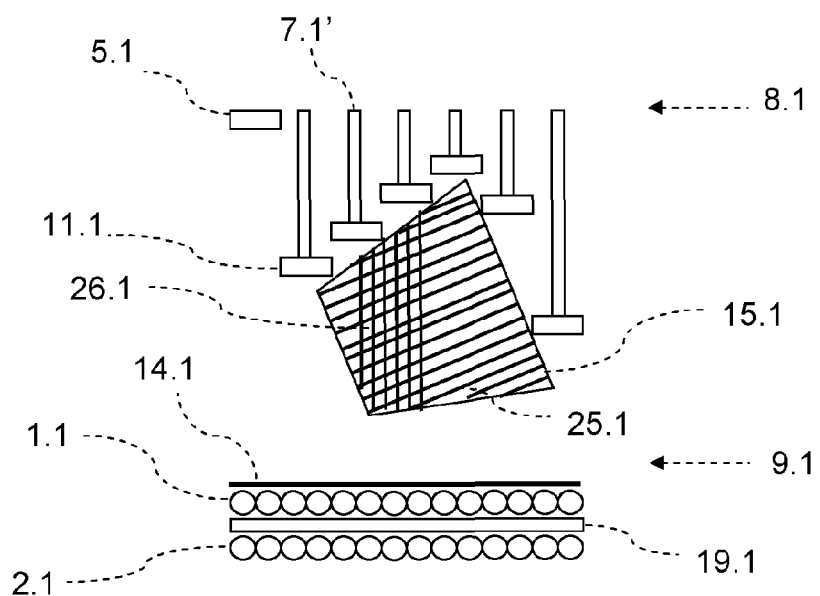
Figure 8:
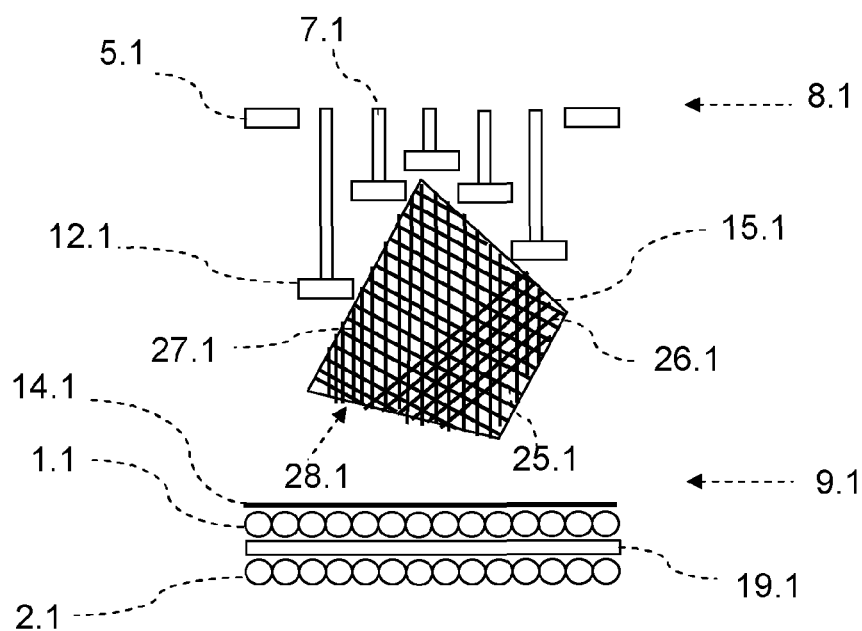

Referring now to FIG. 8a, there is shown an additional embodiment, as used for example in the manufacture of fiber preforms for engine hoods. The used grippers 10.1 are at an intermediate position, the unused grippers 5.1 are in the maximum position 8.1. On first molding tool 15.1, a first layer 25.1 of threads or rovings is draped and fixed. The second molding tool is not illustrated. The supply of the threads or roving s occurs in unwind station 1.1, 2.1. Moreover, a binder material supply 19.1 is available at thread transfer points 14.1.

Placement of one or several additional layers can occur in the same device, or in one or a plurality of other devices according to the present invention, to which the first molding tool 15.1 is transferred along with the first layer 25.1. According to the present invention, as illustrated at FIG. 8b, an additional layer 26.1 is draped on the rotated molding tool. For the sake of clarity only a few threads or roving s are shown. Used grippers 11.1 are positioned along the outer contour of the molding tool, thereby defining it as precisely as possible. For even more precise adaptation, narrower or wider grippers can be used.

Referring now to FIG. 8c, there is shown placement of yet another layer. Used grippers 12.1 are positioned again along the outer contour. Fixing the layers together form the fiber preform 28.1.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Component Identification List 1, 1.1, 2, 2.1 rows of unwind stations
3, 3', 4, 4' unwind stations in use
5, 5.1 row of grippers
6, 6' grippers in pick-up position
7, 7.1, 7', 7.1' guide device for grippers
8, 8.1 location of the maximum positions
9, 9.1 location of pick-up positions
10, 10.1, 11,
11.1, 12, 12.1 grippers in intermediate positions
13, 13' measuring device for thread tension
14, 14.1 thread transfer points
 (possibly also with spreading device and/or device for binder pre-activation)
15 first molding tool in start position
15', 15.1 first molding tool in draping position
16 second molding tool in start position
16' second molding tool in draping position
17 lift table
18 binder material
19, 19.1 binder material supply
20, 20' beginnings of threads or rovings
21 tensioned threads or rovings
22 draped threads or rovings
23, 23' severed threads or rovings
24 scrap
25 first layer of threads or rovings
26.1, 27.1 additional layer of threads or rovings
28, 28.1 fiber preform
b clamping width of a gripper
B overall clamping width of all grippers

What is claimed is:

1. A device for producing fiber preforms, the device comprising:
   a plurality of unwind stations for providing a plurality of threads or rovings;
   a plurality of grippers, each of said plurality of grippers having a maximum position and an assigned thread transfer point and each of said plurality of grippers being individually movable on a plurality of substantially parallel paths between said maximum position and a pick-up position, said pick-up position being at said thread transfer point and being closer to one of said plurality of unwind stations than said maximum position, said plurality of grippers being configured for gripping an origin of one of an individual and a plurality of said threads or rovings; and
   at least one molding tool configured to be brought between said thread transfer points and at least some of said grippers, wherein said plurality of grippers is configured to assume a plurality of different individual intermediate positions on their respective said path and configured to retain a plurality of respective origins of said plurality of threads or rovings at said individual intermediate positions.

2. A device for producing fiber preforms, the device comprising:
   a plurality of unwind stations for providing a plurality of threads or rovings;
   a plurality of grippers, each of said plurality of grippers having a maximum position and an assigned thread transfer point and each of said plurality of grippers being individually movable on a plurality of substantially parallel paths between said maximum position and a pick-up position, said pick-up position being at said thread transfer point and being closer to one of said plurality of unwind stations than said maximum position, said plurality of grippers being configured for gripping an origin of one of an individual and a plurality of said threads or rovings; and at least one molding tool configured to be brought between said thread transfer points and at least some of said grippers, wherein said at least one molding tool is configured to be brought between said thread transfer points and at least some of said grippers in such a way that said threads or rovings are draped over said at least one molding tool.

3. The device according to claim 1, each individual of said plurality of grippers being movable on a substantially linear path from said pick-up position to said maximum position.

4. The device according to claim 3, wherein each said individual gripper is positionable on its respective path, following an outer contour of said at least one molding tool.

5. The device according to claim 1, said plurality of grippers each having a clamping width in a range of between approximately 10 to 500 millimeters (mm).

6. The device according to claim 5, said plurality of grippers each having a clamping width in a range of between approximately 20 to 200 mm.

7. The device according to claim 1, wherein said plurality of grippers is at least 5 grippers.

8. The device according to claim 7, wherein said plurality of grippers is at least 10 grippers.

9. The device according to claim 8, wherein said plurality of grippers is at least 20 grippers.

10. The device according to claim 1, further comprising a binder material supply positioned between said plurality of unwind stations, for supplying a grip binder material, said plurality of grippers also gripping said grip binder material together with said plurality of threads or roving at said thread transfer points.

11. The device according to claim 10, wherein said grip binder material is at least one of a plurality of threads or a fleece, one of consisting of and formed with a thermoplastic or an adhesive.

12. The device according to claim 1, further comprising a separating device configured for at least one of separating said plurality of threads or rovings between said at least one molding tool and said plurality of grippers and separating said plurality of threads or rovings between said at least one molding tool and said thread transfer points.

13. The device according to claim 1, further comprising a fixing device configured for connecting said plurality of threads or rovings with each other into a stable shape one of in said at least one molding tool and around said at least one molding tool.

14. The device according to claim 13, said fixing device being at least one of a heating device and a pressing device.

15. The device according to claim 1, said at least one molding tool being rotatable to add an additional layer of said plurality of threads or rovings onto a first, draped layer of said plurality of threads or rovings, said additional layer having a different fiber orientation than said first, draped layer.

16. The device according to claim 15, said at least one molding tool being rotated by approximately 30°.

17. The device according to claim 16, said at least one molding tool being rotated by approximately 45°.

18. The device according to claim 17, said at least one molding tool being rotated by approximately 60°.

19. The device according to claim 18, said at least one molding tool being rotated by approximately 90°.

* * * * *